United States Patent
Magnacca

(10) Patent No.: US 10,575,544 B1
(45) Date of Patent: Mar. 3, 2020

(54) APPETIZE FOOD PRODUCT AND A METHOD FOR MAKING THE SAME

(71) Applicant: J. Guido's Foods, LLC, Columbus, OH (US)

(72) Inventor: John Felix Magnacca, Columbus, OH (US)

(73) Assignee: J. Guido's Foods, LLC, Columbus, OH (US)

( * ) Notice: Subject to any disclaimer, the term of this patent is extended or adjusted under 35 U.S.C. 154(b) by 396 days.

(21) Appl. No.: 15/342,967

(22) Filed: Nov. 3, 2016

Related U.S. Application Data

(60) Provisional application No. 62/250,437, filed on Nov. 3, 2015.

(51) Int. Cl.
| | | |
|---|---|---|
| *A21D 10/00* | (2006.01) | |
| *A23L 33/00* | (2016.01) | |
| *A23L 13/00* | (2016.01) | |
| *A23L 19/00* | (2016.01) | |
| *A23C 19/00* | (2006.01) | |

(52) U.S. Cl.
CPC ............ *A23L 33/00* (2016.08); *A21D 10/002* (2013.01); *A23C 19/00* (2013.01); *A23L 13/00* (2016.08); *A23L 19/00* (2016.08); *A23V 2002/00* (2013.01)

(58) Field of Classification Search
USPC .................................................. 426/496, 500
See application file for complete search history.

(56) References Cited

U.S. PATENT DOCUMENTS

| | | | |
|---|---|---|---|
| 3,904,772 | A | 9/1975 | Moegle |
| 4,283,431 | A | 8/1981 | Giordano et al. |
| 4,743,452 | A | 5/1988 | Felske et al. |
| 5,094,859 | A | 3/1992 | Sluimer |
| 5,171,590 | A | 12/1992 | Sluimer |
| 5,194,273 | A | 3/1993 | de Bruijne et al. |
| 5,202,138 | A | 4/1993 | Stypula |
| 5,254,351 | A | 10/1993 | de Boer et al. |
| 5,447,738 | A | 9/1995 | de Bruijne et al. |

(Continued)

OTHER PUBLICATIONS

Cinnamon-apple Twist Bread, Oct. 19, 2014.*

(Continued)

*Primary Examiner* — Lien T Tran
(74) *Attorney, Agent, or Firm* — The Law Office of Patrick F. O'Reilly III, LLC

(57) ABSTRACT

A method for making an appetizer food product is disclosed herein. The method includes preparing a dough composition by mixing a predetermined quantity of flour, water, olive oil, sugar, salt, and yeast; flattening and/or compressing the dough composition; adding one or more layers of other ingredients to the dough composition, the other ingredients comprising at least one type of cheese and at least one of type of meat or at least one type of vegetable; rolling the dough composition and the other ingredients into a log-shaped food product; applying olive oil to the log-shaped food product; cutting the log-shaped food product into a plurality of individual rolls; twisting each of the plurality of individual rolls; and freezing each of the plurality of individual rolls for a predetermined period of time without allowing the proofing of the dough composition. An appetizer food product is also disclosed herein.

11 Claims, 5 Drawing Sheets

(56) References Cited

U.S. PATENT DOCUMENTS

| | | | |
|---|---|---|---|
| 5,560,946 A | | 10/1996 | Sanders et al. |
| 5,968,566 A | | 10/1999 | McDaniel et al. |
| 6,136,360 A | * | 10/2000 | Tsuchida .................. A21C 3/08 |
| | | | 425/305.1 |
| 6,165,522 A | * | 12/2000 | Lira ........................ A21C 9/063 |
| | | | 426/500 |
| 6,419,965 B1 | | 7/2002 | Douaire et al. |
| 6,444,245 B1 | * | 9/2002 | Burger .................. A21C 9/063 |
| | | | 425/364 B |
| 6,468,569 B1 | | 10/2002 | Dunker et al. |
| 6,579,554 B2 | | 6/2003 | Moder et al. |
| 6,589,583 B1 | | 7/2003 | Hansen et al. |
| 6,660,311 B2 | | 12/2003 | Goedeken et al. |
| 8,247,013 B2 | | 8/2012 | Upreti et al. |
| D713,118 S | | 9/2014 | Park et al. |
| D714,519 S | | 10/2014 | Park et al. |
| 2003/0134016 A1 | | 7/2003 | Bubar |
| 2003/0165605 A1 | | 9/2003 | Brown et al. |
| 2005/0129821 A1 | | 6/2005 | Goedeken et al. |
| 2005/0153016 A1 | | 7/2005 | Domingues et al. |
| 2008/0089978 A1 | | 4/2008 | Grigg et al. |
| 2010/0015317 A1 | | 1/2010 | DeStafeno |

OTHER PUBLICATIONS

Pizza Roll, Jun. 5, 2015.*
Cimi's Bistro Dinner Menu, Cimi's Bistro at Pinnacle Website, Web page <http://cimisbistro.com/wp-content/uploads/2010/02/Dinner-Menu-4-9.pdf>, 2 pages, dated Aug. 24, 2013, retrieved from Internet Archive Wayback Machine <https://web.archive.org/web/20130824104302/http://cimisbistro.com/wp-content/uploads/2010/02/Dinner-Menu-4-9.pdf> on Sep. 17, 2018.

* cited by examiner illustration of roller system for shaping and twisting product. Rollers are to be connected and driven together within a serviceable enclosure to ensure proper shaping and formation of twistie

FRONT VIEW

BACK VIEW

APPETIZE FOOD PRODUCT AND A METHOD FOR MAKING THE SAME

CROSS-REFERENCE TO RELATED APPLICATIONS

This patent application claims priority to, and incorporates by reference in its entirety, U.S. Provisional Patent Application No. 62/250,437, entitled "Appetizer Food Product And A Method For Making The Same", filed on Nov. 3, 2015.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to an appetizer food product and a method for making the same. More particularly, the invention relates to an appetizer food product comprising a dough composition that is substantially unproofed and a method for making an appetizer food product that utilizes the unproofed dough composition.

2. Background

Prior to the main course of a meal, many restaurants offer their patrons a selection of conventional appetizers that they may choose from. However, these conventional appetizers are often difficult and messy to eat, thereby decreasing restaurant patrons' enjoyment of these conventional appetizers. Also, conventional appetizers often do not complement the beverages that are consumed by the restaurant patrons and/or fail to complement the main entrees that are subsequently served to the restaurant patrons.

Therefore, what is needed is a food product that is generally easy to eat with one's fingers, thereby fulfilling the ever-growing need in the restaurant industry for easy-to-eat finger foods. Moreover, an appetizer food product is needed that complements the other food and beverages that restaurant patrons are consuming during the meal, such as main entrees of the meal and alcoholic beverages served with the meal. Furthermore, there is a need for a method for making the appetizer food product that results in a unique and tasty appetizer that is capable of being flexibly served with different main entrees.

BRIEF SUMMARY OF EMBODIMENTS OF THE INVENTION

Accordingly, the present invention is directed to an appetizer food product and a method for making the same that substantially obviates one or more problems resulting from the limitations and deficiencies of the related art.

In accordance with one or more embodiments of the present invention, there is provided an appetizer food product, which comprises a dough composition that includes a predetermined quantity of flour, water, olive oil, sugar, salt, and yeast; and one or more layers of other ingredients disposed on the dough composition, the other ingredients comprising at least one type of cheese and at least one of type of meat or at least one type of vegetable. When frozen, the appetizer food product has a specific volume of between approximately 0.90 milliliters per gram and approximately 1.2 milliliters per gram, inclusive. After baking, the appetizer food product has a specific volume of between approximately 1.4 milliliters per gram and approximately 1.8 milliliters per gram, inclusive.

In a further embodiment of the present invention, the other ingredients, which are disposed on the dough composition, comprise the at least one type of cheese and a plurality of different types of meats.

In yet a further embodiment, the at least one type of cheese comprises provolone cheese.

In still a further embodiment, the plurality of different types of meats comprise capicola, salami, and pepperoni.

In yet a further embodiment, the other ingredients, which are disposed on the dough composition, comprise the at least one type of cheese and a plurality of different types of vegetables.

In still a further embodiment, the at least one type of cheese comprises provolone cheese.

In yet a further embodiment, the plurality of different types of vegetables comprise sun-dried tomatoes and spinach.

In accordance with one or more other embodiments of the present invention, there is provided a method for making an appetizer food product. The method comprising the steps of: (i) preparing a dough composition by mixing a predetermined quantity of flour, water, olive oil, sugar, salt, and yeast; (ii) flattening and/or compressing the dough composition; (iii) adding one or more layers of other ingredients to the dough composition, the other ingredients comprising at least one type of cheese and at least one of type of meat or at least one type of vegetable; (iv) rolling the dough composition and the other ingredients into a log-shaped food product; (v) applying olive oil to the log-shaped food product; (vi) cutting the log-shaped food product into a plurality of individual rolls; (vii) twisting each of the plurality of individual rolls; and (viii) freezing each of the plurality of individual rolls for a predetermined period of time without allowing the proofing of the dough composition.

In a further embodiment of the present invention, the step of preparing a dough composition by mixing a predetermined quantity of flour, water, olive oil, sugar, salt, and yeast comprises mixing the predetermined quantity of flour, water, olive oil, sugar, salt, and yeast using an automated dough mixer.

In yet a further embodiment, prior to the step of flattening and/or compressing the dough composition, the method further comprises the step of weighing the dough composition using a scale so as to apportion a particular predetermined quantity of the dough composition.

In still a further embodiment, the step of flattening and/or compressing the dough composition comprises flattening and/or compressing the dough composition using a dough roller.

In yet a further embodiment, the other ingredients, which are added to the dough composition, comprise the at least one type of cheese and a plurality of different types of meats.

In still a further embodiment, the plurality of different types of meats comprise capicola, salami, and pepperoni.

In yet a further embodiment, the other ingredients, which are added to the dough composition, comprise the at least one type of cheese and a plurality of different types of vegetables.

In still a further embodiment, the plurality of different types of vegetables comprise sun-dried tomatoes and spinach.

In yet a further embodiment, the step of applying olive oil to the log-shaped food product comprises brushing the olive oil onto the log-shaped food product using a food brush.

In still a further embodiment, the step of cutting the log-shaped food product into a plurality of individual rolls comprises cutting the log-shaped food product into the plurality of individual rolls using an automated cutting device with a cutting blade, the automated cutting device cutting each of the plurality of individual rolls to a predetermined length.

In yet a further embodiment, the step of twisting each of the plurality of individual rolls comprises twisting each of the plurality of individual rolls using an automated twisting device, the automated twisting device comprising a plurality of roller stages with rollers disposed at varying angles relative to one another and having varying roller surface geometries for shaping each of the plurality of individual rolls into a final twisted shape.

In still a further embodiment, prior to the step of freezing each of the plurality of individual rolls, the method further comprises the step of arranging each of the plurality of individual rolls on a sheet pan.

In yet a further embodiment, when frozen, at least one of the plurality of individual rolls has a specific volume of between approximately 0.90 milliliters per gram and approximately 1.2 milliliters per gram, inclusive.

In still a further embodiment, after the step of freezing each of the plurality of individual rolls, the method further comprises the step of baking each of the plurality of individual rolls for a predetermined period of time in an oven.

In yet a further embodiment, after baking, at least one of the plurality of individual rolls has a specific volume of between approximately 1.4 milliliters per gram and approximately 1.8 milliliters per gram, inclusive.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same elements are always denoted using the same reference characters so that, as a general rule, they will only be described once.

DETAILED DESCRIPTION OF EMBODIMENTS OF THE INVENTION

Figure 1:
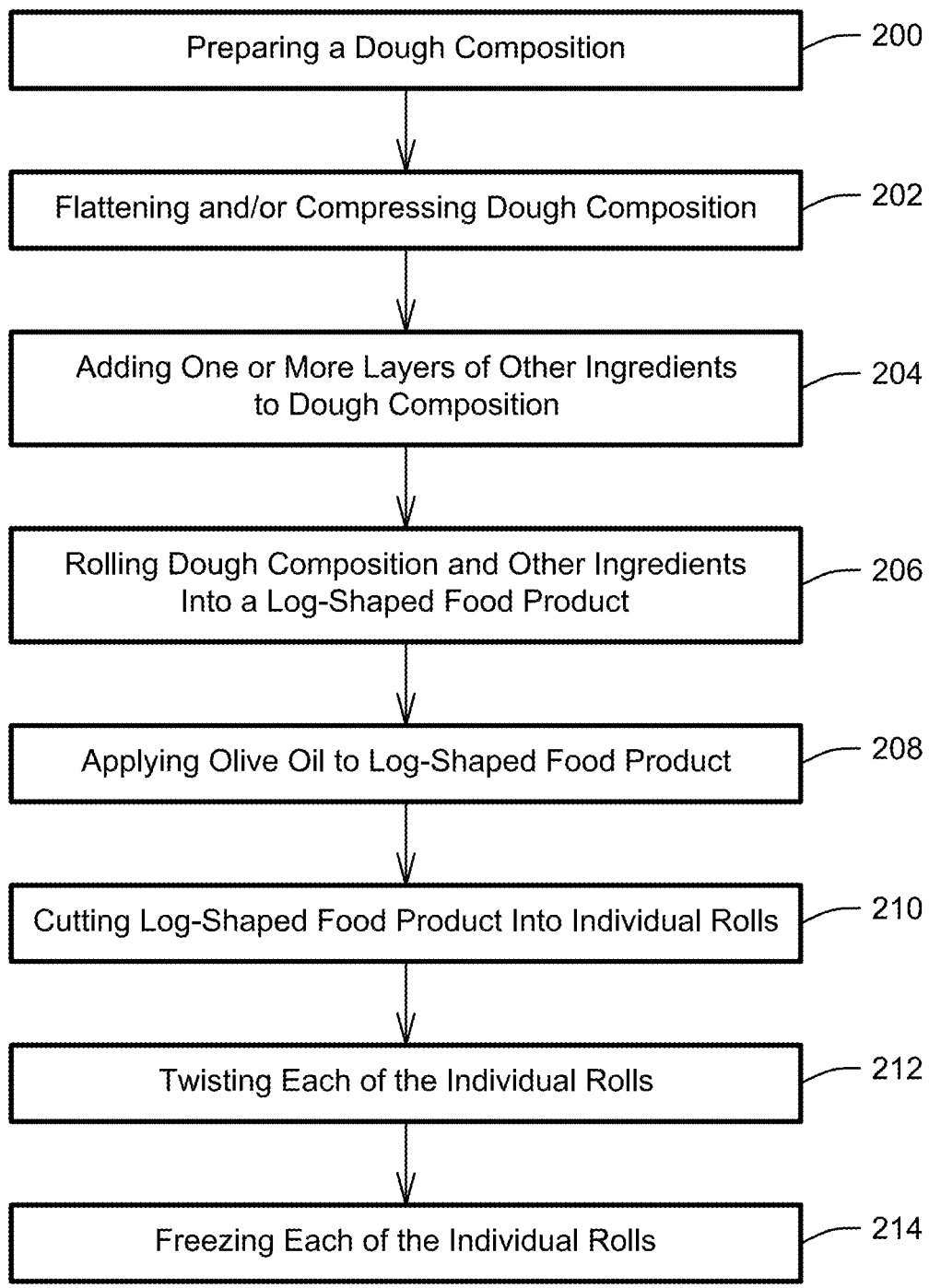
FIG. 1 is a flowchart illustrating exemplary steps for making an appetizer food product, according to an embodiment of the invention.

According to one or more embodiments, an appetizer food product, such as a twisted roll appetizer food product, generally comprises a dough composition and one or more layers of other ingredients. The dough composition of the appetizer food product may comprise a predetermined quantity of flour, water, olive oil, sugar, salt, and yeast. For example, in one exemplary embodiment, the dough composition may comprise approximately 12.5 pounds of high gluten wheat flour, approximately 3 quarts of water, approximately 0.5 cups of olive oil, approximately 7 ounces of sugar, approximately 2 ounces of salt, and approximately 1.5 ounces of yeast. In one embodiment of the appetizer food product, wherein Italian meats and cheese are provided in the twisted roll appetizer food product, the other ingredients of the appetizer food product may comprise provolone cheese, capicola, salami, and cooked pepperoni. In this one embodiment, when the appetizer food product is frozen, the appetizer food product has a specific volume of between approximately 0.90 milliliters per gram and approximately 1.2 milliliters per gram, inclusive of the upper and lower limits of the range (or between 0.90 milliliters per gram and 1.2 milliliters per gram, inclusive). More particularly, in an illustrative embodiment, the frozen appetizer food product has a specific volume of approximately 1.05 milliliters per gram (i.e., volume of 47.8 milliliters/weight of 45.3 grams) with a confidence band of plus or minus 10% (i.e., +/−10%). Further, in this one embodiment, after baking, the appetizer food product has a specific volume of between approximately 1.4 milliliters per gram and approximately 1.8 milliliters per gram, inclusive of the upper and lower limits of the range (or between 1.4 milliliters per gram and 1.8 milliliters per gram, inclusive). More particularly, in an illustrative embodiment, the baked appetizer food product has a specific volume of approximately 1.56 milliliters per gram (i.e., volume of 66.3 milliliters/weight of 42.5 grams) with a confidence band of plus or minus 10% (i.e., +/−10%). In order to accurately determine these specific volume values, the volume of the baked appetizer food product was measured using a laser-based scanner device (i.e., the Volscan Profiler by Texture Technologies Corporation). As an alternative to using the laser-based scanner device, the volume of the baked appetizer food product may also be obtained using the water displacement method. Although, volume determination using a laser-based scanner device is known to produce more accurate results than that determined using the water displacement method.

In an alternative embodiment of the appetizer food product, wherein vegetables and cheese are provided in the twisted roll appetizer food product rather than Italian meats and cheese, the other ingredients of the appetizer food product may comprise provolone cheese, sun-dried tomatoes, spinach and roasted garlic.

In yet another alternative embodiment, the appetizer food product is in the form of a sweet appetizer or a dessert food product, rather than one containing Italian meats and cheese or vegetables and cheese. In this alternative embodiment, the dough composition described above is glazed with a sweet coating formed using whole milk and powdered sugar so as to result in sweet, dessert version of the twisted roll food product. In addition, the dessert version of the twisted roll food product also comprises cinnamon, butter, salt, and egg whites. As such, the dessert version of the twisted roll food product is in the form of a cinnamon twisted roll food product.

Now, in accordance with one or more embodiments, a method for making the appetizer food product (i.e., the twisted roll appetizer food product) will be explained. Initially, as shown in step 200 of FIG. 1, the dough composition of the appetizer food product is prepared by mixing a predetermined quantity of flour, water, olive oil, sugar, salt, and yeast. For example, in one exemplary embodiment, the dough composition may comprise approximately 12.5 pounds of high gluten wheat flour, approximately 3 quarts of water (6 lbs.), approximately 0.5 cups of olive oil, approximately 7 ounces of sugar, approximately 2 ounces of salt, and approximately 1.5 ounces of yeast. The exemplary quantities of the ingredients listed above make a total of approximately twenty (20) logs of dough for the appetizer food product. Each log of dough weighs approximately 19.75 to 20.0 ounces. In order to facilitate the mixing of the ingredients forming the dough composition, an automated dough mixer with a mixing bowl may be used.

After the ingredients of the dough composition are removed from the mixing bowl, the dough composition may be weighed using a scale so as to apportion a particular predetermined quantity or quantities of the dough composition. For example, in an exemplary embodiment, the dough composition may be divided into a total of twenty (20) individual portions for forming a total of twenty (20) logs of dough for the appetizer food product. Each portion of dough may weigh approximately 19.75 to 20.0 ounces.

Then, following the weighing and dividing of the dough, each portion of the dough may be flattened and compressed using a dough roller into a generally flat shape (refer to step 202 of FIG. 1). After which, in step 204 of FIG. 1, the one or more layers of other ingredients are added to the portions of dough. When Italian meats and cheese are provided in the appetizer food product, the other ingredients that are added to each portion of dough may comprise provolone cheese, capicola, salami, and cooked pepperoni. Alternatively, when vegetables and cheese are provided in the appetizer food product rather than Italian meats and cheese, the other ingredients that are added to each portion of dough may comprise provolone cheese, sun-dried tomatoes, spinach, and roasted garlic. After the other ingredients are added to each portion of dough, each portion of dough and the other ingredients added thereto are rolled into a log-shaped food product (see step 206 of FIG. 1) so as to form, for example, a total of twenty (20) logs. In an exemplary embodiment, when Italian meats and cheese are provided in the appetizer food product, the dough, meat, and cheese content in each log (i.e., prior to cutting and subdividing) may be as follows: (i) approximately 20 ounces of dough, rolled to approximately 0.25 inches in thickness; (ii) approximately 6 ounces of provolone cheese, (iii) approximately 2 ounces of capicola, (iv) approximately 2 ounces of salami, and (v) approximately 2.5 ounces of pepperoni.

Next, after the forming of each log of the appetizer food product, referring to step 208 of FIG. 1, each log is brushed with herbed olive oil using a food brush (e.g., a pastry brush) prior to the cutting of each log into individual rolls. Advantageously, the herbed olive oil maintains the integrity of the twisted appetizer food product. Then, following the application of the herbed olive oil, each of the logs is cut into a plurality of individual rolls (as shown in step 210 of FIG. 1). For example, in an exemplary embodiment, each of the logs may be cut into approximately twenty-three (23) to twenty-five (25) individual appetizer rolls. As such, in an exemplary embodiment, when each log is cut into twenty-five (25) individual appetizer rolls, each of the individual appetizer rolls of the log may comprise approximately 0.8 ounces of dough, (ii) approximately 0.24 ounces of provolone cheese, (iii) approximately 0.08 ounces of capicola, (iv) approximately 0.08 ounces of salami, and (v) approximately 0.1 ounces of pepperoni.

In a preferred embodiment, the step of cutting the log-shaped food product into a plurality of individual rolls (i.e., step 210 in FIG. 1) comprises cutting the log-shaped food product into the plurality of individual rolls using an automated cutting device with a cutting blade. In this preferred embodiment, the automated cutting device cuts each of the plurality of individual rolls to a predetermined length (e.g., an average precooked length of between approximately 3.75 inches and 4.0 inches as described hereinafter).

After the individual rolls are cut from each of the logs, each of the individual rolls is twisted so as to give each of the individual rolls an overall twisted appearance (see step 212 of FIG. 1). In a preferred embodiment, as will be described in detail hereinafter, each of the rolls may be quickly and efficiently twisted using an automated twisting device. Also, in a preferred embodiment, the dough is rolled and twisted before it has time to proof. In order to ensure that the dough remains unproofed, it is preferred that the dough manipulation steps described above (i.e., rolling, twisting, etc.) be performed in a room with an air temperature of 50 degrees Fahrenheit or below. In the preferred embodiment, the dough remains unproofed. The gluten in the dough causes the dough to stretch. In the preferred embodiment, the integrity of the gluten in the dough is maintained, and thus, the dough will not substantially puff up or rise when the rolls are baked.

Figure 2:
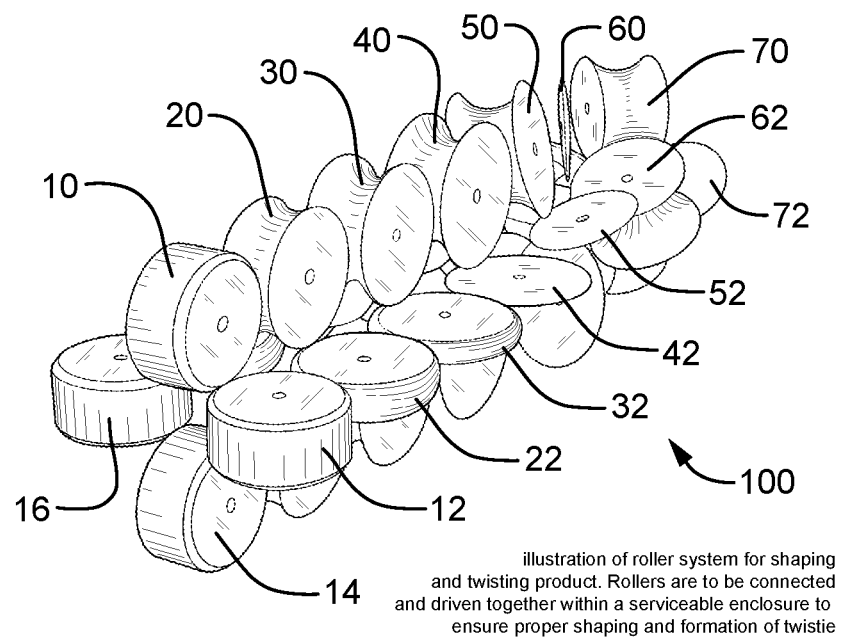
FIG. 2 is a diagrammatic perspective view of an exemplary roller system of an automated twisting device for shaping and twisting each of the individual appetizer rolls, according to an embodiment of the invention.
Figure 3:
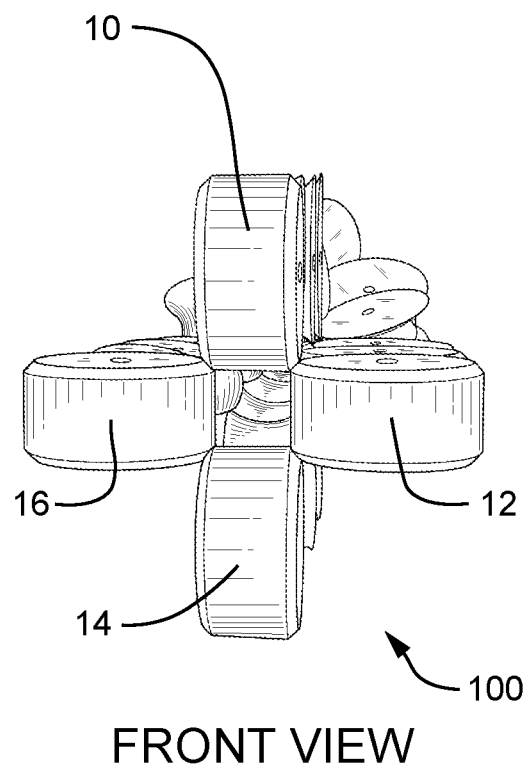
FIG. 3 is a front end view of the exemplary roller system of FIG. 2.
Figure 4:
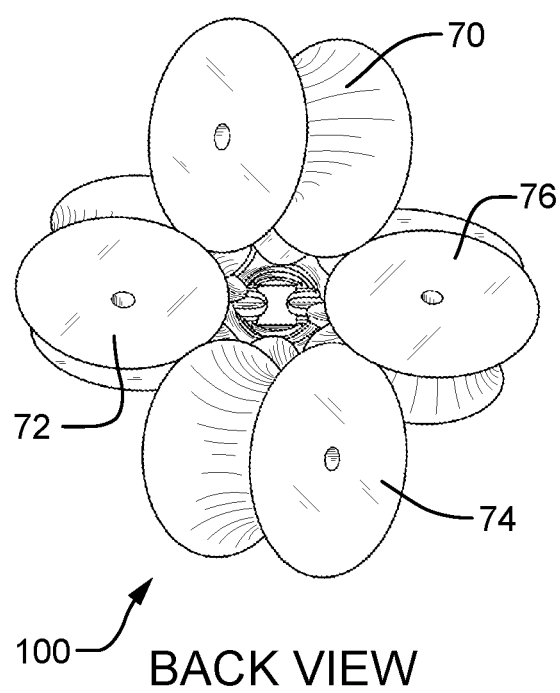
FIG. 4 is a rear end view of the exemplary roller system of FIG. 2.
Figure 5:
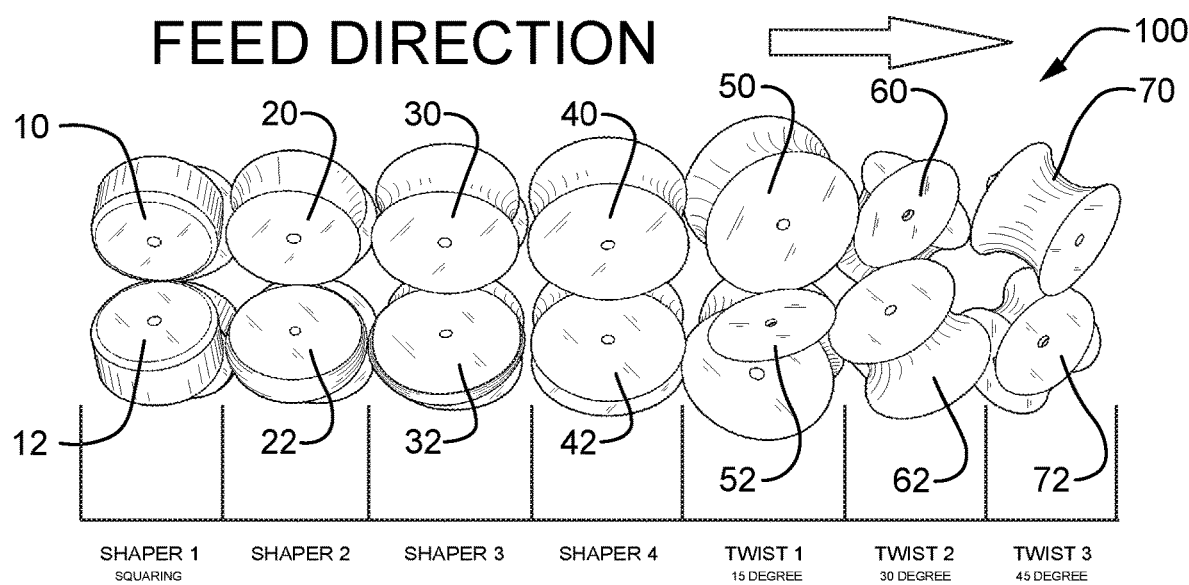
FIG. 5 is a side elevational view of the exemplary roller system of FIG. 2 illustrating the feed direction and the various stages of the roller system.

In a preferred embodiment, the step of twisting each of the plurality of individual rolls comprises twisting each of the plurality of individual rolls using an automated twisting device. For example, with reference to FIGS. 2-5, the automated twisting device may comprise a roller system 100 with a plurality of roller stages having rollers 10-76 disposed at varying angles relative to one another and having varying roller surface geometries for shaping each of the plurality of individual rolls into a final twisted shape. Initially, referring to the side view of FIG. 5, it can be seen that the exemplary roller system 100 may comprise a first shaping stage (i.e., Shaper 1 stage for squaring the rolls), a second shaping stage (i.e., Shaper 2 stage), a third shaping stage (i.e., Shaper 3 stage), and a fourth shaping stage (i.e., Shaper 4 stage). Also, as shown in FIG. 5, the exemplary roller system 100 may further comprise a first twisting stage (i.e., a 15 degree Twist 1 stage), a second twisting stage (i.e., a 30 degree Twist 2 stage), and a third twisting stage (i.e., a 45 degree Twist 3 stage). As best shown in FIGS. 2 and 5, the rollers 10-76 of the various stages are each set at progressively different angles. As each individual roll appetizer progresses through each shaping stage, the angles of the rollers begin to shape the flat roll. And, as each individual roll appetizer progresses through each twisting stage, each individual roll appetizer is gradually twisted until reaching the third twisting stage, at which point, each individual roll appetizer is completely twisted and formed. As shown in FIG. 5, the feed direction of the individual roll appetizers is from left to right (i.e., the roll appetizers enter the roller system 100 of the automated twisting device at the Shaper 1 stage and exit the roller system 100 of the automated twisting device at the Twist 3 stage).

Referring again to FIGS. 2 and 5, it can be seen that the surface concavity of the rollers 10-76 change from stage to stage (i.e., the rollers 10, 12, 14, 16 of the Shaper 1 stage have circular sidewalls that are generally flat thereacross), while a majority of the rollers 20-74 of the latter stages have a concave or convex surface profile. That is, in the exemplary embodiment of FIGS. 2-5, the surface of the rollers 10-76 change progressively, beginning with the flat roll, and as the roll moves through each stage, the surface geometry of each stage changes so as to shape the flat roll into a complete twist. For example, referring collectively to FIGS. 2-5, the rollers 10, 12, 14, 16 of the Shaper 1 stage have circular sidewalls without concave or convex portions, the roller 20 of the Shaper 2 stage has a concave profile and the roller 22 of the Shaper 2 stage has a slightly convex profile, the roller 30 of the Shaper 3 stage has a concave profile and the roller 32 of the Shaper 3 stage has a slightly convex profile, the roller 40 of the Shaper 4 stage has a concave profile and the roller 42 of the Shaper 4 stage has a thin, slightly convex profile, the roller 50 of the Twist 1 stage has a concave profile and the roller 52 of the Twist 1 stage has a thin, slightly convex profile, the roller 60 of the Twist 2 stage has a thin, slightly convex profile and the roller 62 of the Twist 2 stage has a concave profile, and the roller 70 of the Twist 3 stage has a concave profile, the roller 72 of the Twist 3 stage has a thin, slightly convex profile, the roller 74 of the Twist 3 stage has a concave profile, and the roller 76 of the Twist 3 stage has a thin, slightly convex profile. In the exemplary embodiment, the rollers 10-76 of the roller system 100 of the automated twisting device may be connected and driven together, and housed within a serviceable enclosure, so as to ensure proper shaping and formation of the roll appetizers. Advantageously, the use of the automated twisting device for twisting each of the individual roll appetizers greatly increases the speed of the appetizer food product production process by eliminating the need for hand rolling by multiple people, thereby saving both time and money.

Following the cutting and twisting of each of the individual rolls, each of the appetizer rolls are arranged on one or more sheet pans prior to the freezing thereof. Finally, after being arranged on one or more sheet pans, the individual twisted appetizer rolls are individually quick frozen (IQF) in step 214 of FIG. 1 for a predetermined period of time (e.g., for 4 to 5 hours) prior to being packed for shipping (i.e., if the rolls are to be packaged and shipped for distribution) or baked (i.e., if the rolls are to be baked on site). When the individual twisted appetizer rolls are baked on site, they are baked for a predetermined period of time (e.g., between approximately 6 and approximately 8 minutes) in an oven.

In one or more embodiments, when the twisted appetizer rolls are made in accordance with the aforedescribed process with Italian meats and cheese, each of the individual appetizer rolls has a specific volume of between approximately 0.90 milliliters per gram and approximately 1.2 milliliters per gram, inclusive (or between 0.90 milliliters per gram and 1.2 milliliters per gram, inclusive), when they are in their frozen state. Also, in these one or more embodiments, when the twisted appetizer rolls are made in accordance with the aforedescribed process, each of the individual appetizer rolls has a specific volume of between approximately 1.4 milliliters per gram and approximately 1.8 milliliters per gram, inclusive (or between 1.4 milliliters per gram and 1.8 milliliters per gram, inclusive), when they are in their baked state.

In an exemplary embodiment, each of the twisted appetizer rolls comprises three layers of cheese and four layers of meats. Also, in an exemplary embodiment, when Italian meats and cheese are provided in the appetizer food product, the twisted appetizer rolls have an average length of between approximately 3.75 inches and 4.0 inches (or between 3.75 inches and 4.0 inches), an average weight of approximately 1.5 ounces, a precooked diameter of approximately 1.0 inch, and a diameter after cooking of between approximately 1.625 inches and 1.875 inches (or between 1.625 inches and 1.875 inches). In addition, in an exemplary embodiment, when vegetables and cheese are provided in the appetizer food product, the twisted appetizer rolls have an average length of between approximately 3.75 inches and 4.0 inches (or between 3.75 inches and 4.0 inches), an average weight of approximately 1.5 ounces, a precooked diameter of approximately 1.0 inch, and a diameter after cooking of between approximately 1.625 inches and 1.875 inches (or between 1.625 inches and 1.875 inches).

Also, in one or more embodiments, after they are baked, the twisted appetizer rolls may be served with a variety of different dipping sauces. For example, the twisted appetizer rolls may be served with marinara sauce or alfredo sauce for dipping.

It is readily apparent that the aforedescribed appetizer food product and the method for making the same has numerous advantages and benefits. First, the food product described herein is easy to eat with one's fingers, and thus, fulfills the ever-growing need in the restaurant industry for easy-to-eat finger foods. Secondly, the appetizer food product described hereinabove complements the other food and beverages that restaurant patrons are consuming during the meal, such as main entrees of the meal and alcoholic beverages served with the meal. Finally, the aforedescribed method for making the appetizer food product results in a unique and tasty appetizer that is capable of being flexibly served with different main entrees.

Any of the features or attributes of the above described embodiments and variations can be used in combination with any of the other features and attributes of the above described embodiments and variations as desired. Also, as it is used throughout this disclosure, the conjunction "and/or" means one, or the other, or both (e.g., when it is said that the dough composition is flattened and/or compressed, this means that the dough composition may be flattened, the dough composition may be compressed, or that the dough composition may be flattened and compressed).

Although the invention has been shown and described with respect to a certain embodiment or embodiments, it is apparent that this invention can be embodied in many different forms and that many other modifications and variations are possible without departing from the spirit and scope of this invention. For example, besides providing the twisted appetizer rolls with Italian meats and cheese, and vegetables and cheese therein, it is to be understood that other suitable ingredients may also be provided in the twisted appetizer rolls, such as the ingredients described above in conjunction with the cinnamon twisted roll food product.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A method for making an appetizer food product, said method comprising the steps of:
   preparing a dough composition by mixing a predetermined quantity of flour, water, olive oil, sugar, salt, and yeast;
   flattening and/or compressing said dough composition;
   adding one or more layers of other ingredients to said dough composition, said other ingredients comprising at least one type of cheese and at least one of type of meat or at least one type of vegetable;
   rolling said dough composition and said other ingredients into a log-shaped food product;
   applying olive oil to said log-shaped food product;
   cutting said log-shaped food product into a plurality of individual rolls;
   twisting each of said plurality of individual rolls, wherein the step of twisting each of said plurality of individual rolls comprises twisting each of said plurality of individual rolls using an automated twisting device, said automated twisting device comprising a plurality of roller stages with rollers disposed at varying angles relative to one another and having varying roller surface geometries for shaping said each of said plurality of individual rolls into a final twisted shape; and
   freezing said each of said plurality of individual rolls for a predetermined period of time without allowing the proofing of said dough composition; wherein, when frozen, at least one of said plurality of individual rolls has a specific volume of between approximately 0.90 milliliters per gram and approximately 1.2 milliliters per gram, inclusive; and wherein, after baking, said at least one of said plurality of individual rolls has a specific volume of between approximately 1.4 milliliters per gram and approximately 1.8 milliliters per gram, inclusive.

2. The method according to claim 1, wherein the step of preparing a dough composition by mixing a predetermined quantity of flour, water, olive oil, sugar, salt, and yeast comprises mixing said predetermined quantity of flour, water, olive oil, sugar, salt, and yeast using an automated dough mixer.

3. The method according to claim 1, wherein, prior to the step of flattening and/or compressing said dough composition, said method further comprises the step of:
   weighing said dough composition using a scale so as to apportion a particular predetermined quantity of said dough composition.

4. The method according to claim 1, wherein the step of flattening and/or compressing said dough composition comprises flattening and/or compressing said dough composition using a dough roller.

5. The method according to claim 1, wherein said other ingredients, which are added to said dough composition, comprise said at least one type of cheese and a plurality of different types of meats, said plurality of different types of meats comprising capicola, salami, and pepperoni.

6. The method according to claim 1, wherein said other ingredients, which are added to said dough composition, comprise said at least one type of cheese and a plurality of different types of vegetables, said plurality of different types of vegetables comprising sun-dried tomatoes and spinach.

7. The method according to claim 1, wherein the step of applying olive oil to said log-shaped food product comprises brushing said olive oil onto said log-shaped food product using a food brush.

8. The method according to claim 1, wherein the step of cutting said log-shaped food product into a plurality of individual rolls comprises cutting said log-shaped food product into said plurality of individual rolls using an automated cutting device with a cutting blade, said automated cutting device cutting each of said plurality of individual rolls to a predetermined length.

9. The method according to claim 1, wherein, prior to the step of freezing each of said plurality of individual rolls, said method further comprises the step of:
   arranging each of said plurality of individual rolls on a sheet pan.

10. The method according to claim 1, wherein, after the step of freezing said each of said plurality of individual rolls, said method further comprises the step of:
    baking said each of said plurality of individual rolls for a predetermined period of time in an oven.

11. A method for making an appetizer food product, said method comprising the steps of:
    preparing a dough composition by mixing a predetermined quantity of flour, water, olive oil, sugar, salt, and yeast;
    flattening and/or compressing said dough composition;
    adding one or more layers of other ingredients to said dough composition, said other ingredients comprising at least one type of cheese and at least one of type of meat or at least one type of vegetable;
    rolling said dough composition and said other ingredients into a log-shaped food product;
    applying olive oil to said log-shaped food product;
    cutting said log-shaped food product into a plurality of individual rolls;
    twisting each of said plurality of individual rolls, wherein the step of twisting each of said plurality of individual rolls comprises twisting each of said plurality of individual rolls using an automated twisting device, said automated twisting device comprising a plurality of roller stages with rollers disposed at varying angles relative to one another and having varying roller surface geometries for shaping said each of said plurality of individual rolls into a final twisted shape; and
    freezing said each of said plurality of individual rolls for a predetermined period of time without allowing the proofing of said dough composition.

* * * * *